(12) United States Patent
Kubota et al.

(10) Patent No.: US 7,161,326 B2
(45) Date of Patent: Jan. 9, 2007

(54) BATTERY-POWERED ELECTRICAL DEVICE HAVING A DETACHABLE BATTERY PACK

(75) Inventors: Atsumasa Kubota, Hikone (JP); Toshiharu Ohashi, Sakata-gun (JP)

(73) Assignee: Matsushita Electric Works, Ltd., Osaka (JP)

( * ) Notice: Subject to any disclaimer, the term of this patent is extended or adjusted under 35 U.S.C. 154(b) by 262 days.

(21) Appl. No.: 10/488,862

(22) PCT Filed: Apr. 23, 2003

(86) PCT No.: PCT/JP03/05155

§ 371 (c)(1),
(2), (4) Date: Mar. 8, 2004

(87) PCT Pub. No.: WO03/098719

PCT Pub. Date: Nov. 27, 2003

(65) Prior Publication Data

US 2004/0257033 A1 Dec. 23, 2004

(30) Foreign Application Priority Data

Apr. 23, 2003 (JP) .............................. 2002-121408

(51) Int. Cl.
*H01M 10/46* (2006.01)
(52) U.S. Cl. ..................................... 320/112

(58) Field of Classification Search ................ 320/107, 320/112, 114, 127, 135, 136
See application file for complete search history.

(56) References Cited

FOREIGN PATENT DOCUMENTS

| JP | 06-310114 A1 | 11/1994 |
|----|--------------|---------|
| JP | 07-107660 A1 | 4/1995 |
| JP | 07-245096 A1 | 9/1995 |
| JP | 09-106793 A1 | 4/1997 |

OTHER PUBLICATIONS

International Search Report for PCT/JP03/05155 mailed on Sep. 16, 2003.

*Primary Examiner*—Edward H. Tso
(74) *Attorney, Agent, or Firm*—Rader, Fishman & Grauer PLLC; Carl Schaukowitch

(57) ABSTRACT

The battery pack used for the battery powered electrical device of the present invention comprises a case for accommodating at least two battery modules, a switching means provided on a side of the case, and an output terminal formed on the case. The switching means selectively closes and opens a series electrical connection of the at least two battery modules. The switching means cooperates with an actuator, which is provided on a side of a device's main body holding the battery pack detachably, to establish the series electrical connection when the case is attached to the device's main body, and to interrupt the series electrical connection when the case is detached from the device's main body.

4 Claims, 3 Drawing Sheets

BATTERY-POWERED ELECTRICAL DEVICE HAVING A DETACHABLE BATTERY PACK

TECHNICAL FIELD

This invention relates to a battery powered electrical device having a detachable battery pack.

BACKGROUND ART

A conventional battery pack for a battery powered electrical device incorporates a plurality of battery modules which are always connected in series. The battery pack has an output terminal to output a total voltage of the battery modules connected in series to the outside of the battery pack. When the battery pack is attached to a device's main body, the battery pack supplies electric power for the device's main body through the output terminal, and drives the device's main body.

When the voltage outputted from the output terminal is on the order of 10V, there are few problems, but when the voltage is on the order of 100V, an electric shock may occur if a body touches the output terminal, or smoking or ignition may occur if a piece of metal touches the output terminal.

DISCLOSURE OF THE INVENTION

In view of the above problem, the object of the present invention is to provide a battery powered electrical device having a safety battery pack which will never cause an electric shock or a short circuit even if a body or a piece of metal touches the output terminal.

The battery pack used for the battery powered electrical device of the present invention comprises a case for accommodating at least two battery modules, a switching means provided on a side of the case, and an output terminal formed on the case. The switching means selectively closes and opens a series electrical connection of the at least two battery modules. The switching means cooperates with an actuator, which is provided on a side of a device's main body holding the battery pack detachably, to establish the series electrical connection when the case is attached to the device's main body, and to interrupt the series electrical connection when the case is detached from the device's main body, i.e., when the actuator is detached from the case. The output terminal is connected to an input terminal of the device's main body, and applies the series-connected voltage of the at least two battery modules for the device's main body upon closing the switching means.

Therefore, this battery pack will never cause an electric shock or a short circuit even if a body or a piece of metal touches the output terminal when this battery pack is not attached to the device's main body; because the series electrical connection of the at least two battery modules is interrupted then by opening the switching means. On the other hand, when this battery pack is attached to the device's main body, the switching means is forced to be closed, and the at least two battery modules are connected in series, thereby allowing the output terminal to supply electric power for the device's main body.

Preferably, the switching means has at least one pair of fixed contacts and a movable contact. The at least two battery modules have a positive electrode and a negative electrode, respectively, and the one pair of fixed contacts is connected to the positive electrode of one of the at least two battery modules and to the negative electrode of the other of the at least two battery modules, respectively. The movable contact is movable between a closed position where the fixed contacts are connected by the movable contact and an open position where the fixed contacts are disconnected, and the movable contact is normally biased toward the open position. The movable contact is disposed within an opening provided in the case in an engageable relation with the actuator so that the movable contact is forced to move into the closed position by the actuator when the actuator is inserted into the opening.

In this case, because the series electrical connection of the at least two battery modules is established only when the actuator is inserted into the opening, when the case is not attached to the device's main body, the series electrical connection of the at least two battery modules is interrupted; therefore, there is no possibility of an electric shock or a short circuit even if a body or a piece of metal touches the output terminal.

Alternatively, it is also preferred that the switching means has at least one pair of fixed electrodes. The case has a joint part for coupling to the device's main body, and the fixed electrodes are connected to the positive electrode of one of the at least two battery modules and to the negative electrode of the other of the at least two battery modules, respectively, and the fixed electrodes are disposed on the joint part in spaced relation to each other. The actuator is in the form of a movable plate which is adapted to connect between the fixed electrodes electrically when the joint part is coupled to the device's main body.

In this case, because the series electrical connection of the at least two battery modules is established only when the movable plate interconnects the fixed electrodes, when the case is not attached to the device's main body, the series electrical connection of the at least two battery modules is interrupted; therefore, there is no possibility of an electric shock or a short circuit even if a body or a piece of metal touches the output terminal.

If the switching means has at least two pairs of the fixed electrodes, it is preferred that each one pair of the fixed electrodes is disposed on each one of different faces of a polygon-shaped joint part. Each of the pairs of the fixed electrodes connect between the positive electrode and the negative electrode of adjacent battery modules. The fixed electrodes on the same face are disposed in spaced relation to each other. The actuators are respectively in the form of a movable plate which is adapted to interconnect between the fixed electrodes when the case is physically coupled to the device's main body. Therefore, this battery pack will never cause an electric shock or a short circuit even if a body or a piece of metal touches one face of the polygon-shaped joint part.

BEST MODE FOR CARRYING OUT THE INVENTION

The present invention will be described in more detail below with accompanying drawings.

Figure 1:
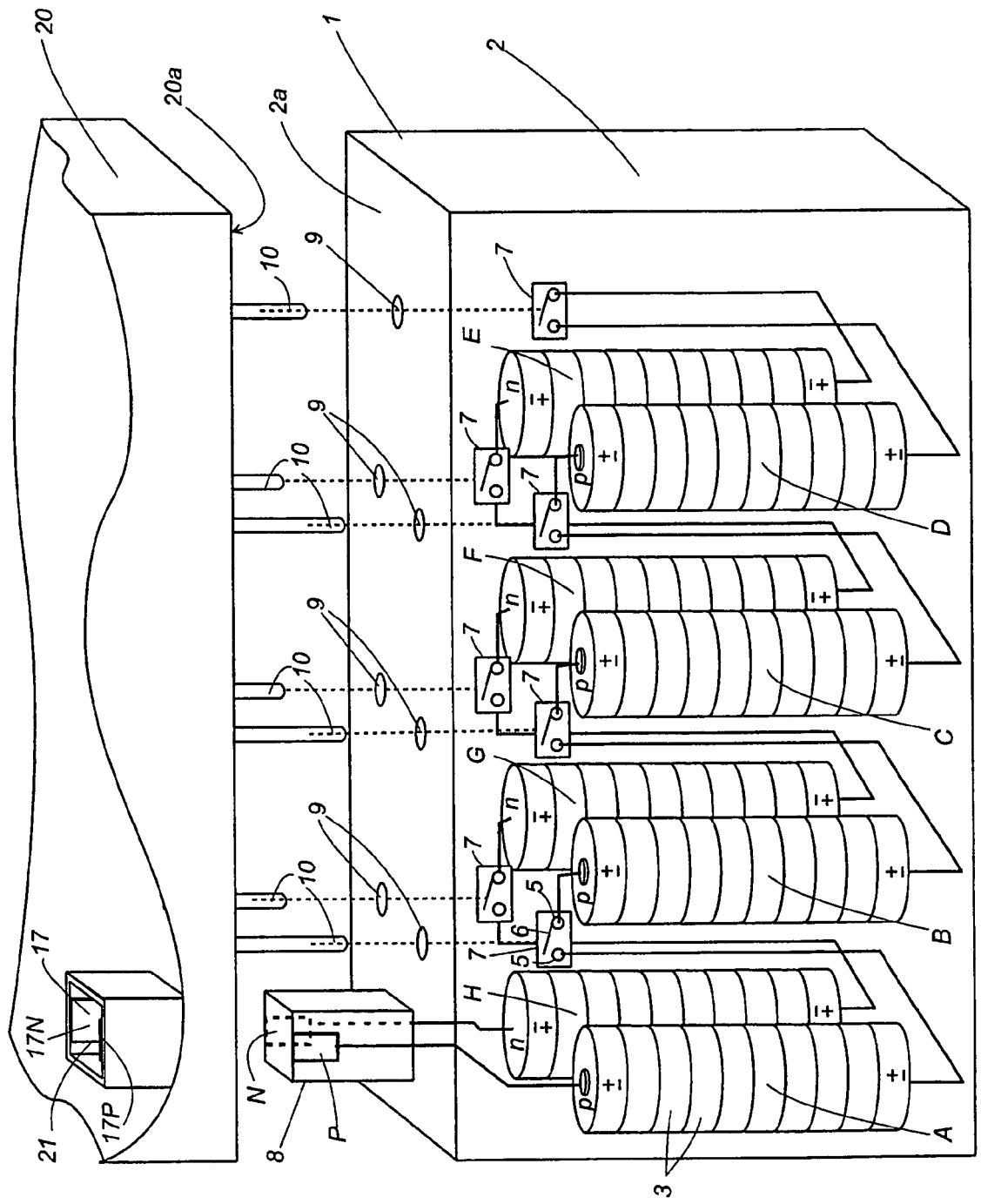
FIG. 1 is a view illustrating a battery powered electrical device in accordance with a first embodiment of the present invention.

FIG. 1 shows a battery powered electrical device in accordance with a first embodiment of the present invention. The battery powered electrical device comprises a device's main body 20 which has in its inside an electrical driving source such as a large capacity motor, and a battery pack 1 which is held by the device's main body detachably and supplies a large capacity power for the device's main body.

The battery pack 1 has eight battery modules A–H inside the case 2. Each of the battery modules A–H comprises ten 1.2-volts battery cells 3 connected in series, and outputs 12 volts. Each of the battery modules A–H has a positive electrode p and a negative electrode n at both ends to output a series-connected voltage of 12 volts. A positive electrode p of a battery module A is electrically connected to a positive output terminal P of an output terminal 8 protruding from one surface 2a of the case 2, and a negative electrode n of a battery module H is electrically connected to a negative output terminal N of the output terminal 8. Except for the positive electrode p of the battery module A and the negative electrode n of the battery module H, a negative electrode n of one of adjacent battery modules and a positive electrode p of the other of the adjacent battery modules are connected through a switch 7. Each of the switches 7 selectively closes and opens a series electrical connection of adjacent battery modules. Each of the switches 7 has one pair of fixed contacts 5, 5 and a movable contact 6. The fixed contacts 5, 5 are connected to the negative electrode n of one of adjacent battery modules and to the positive electrode of the other of the adjacent battery modules, respectively. Each of the movable contacts 6 is movable between a closed position where the fixed contacts 5, 5 are connected by the movable contact 6 and an open position where the fixed contacts 5, 5 are disconnected, and is normally biased toward the open position by a spring. When movable contact 6 of every switch 7 is in the closed position, the battery modules A–H are electrically connected in series, thereby allowing the battery pack to output a voltage of 96 volts through the positive output terminal P and negative output terminal N of the output terminal 8. The movable contacts 6 are disposed within seven openings 9 provided in the face 2a of the case 2, respectively.

On a surface 20a of the device's main body 20 to which the battery pack 1 can be attached, column-shaped actuators 10 and an insertion hole 21 are provided. The actuators 10 are formed at seven places corresponding to the openings 9 of the battery pack 1, respectively. On the inner wall of the insertion hole 21, input terminal 17, which is composed of a positive input terminal 17P and a negative input terminal 17N, is formed. Each of the actuators 10 will be inserted into the corresponding opening 9 when the battery pack is attached to the device's main body 20. When the actuator 10 is inserted into the opening 9, the movable contact 6 will be pushed by the actuator 10 and forced to move into the closed position, thereby connecting adjacent battery modules in series. When the output terminal 8 is inserted, the positive input terminal 17P and the negative input terminal 17N will contact the positive output terminal P and the negative output terminal N of the output terminal 8, respectively. The device's main body 20 is driven by the power supplied from the output terminal 8 of the battery pack 1 via the input terminal 17.

Because the movable contact 6 is biased toward the open position, the series electrical connection of the battery modules A–H is interrupted when the battery pack 1 is not attached to the device's main body 20; therefore, there is no possibility of an electric shock or a short circuit even if a body or a piece of metal touches the positive output terminal P and negative output terminal N of the output terminal 8. On the other hand, when the battery pack 1 is attached to the device's main body 20, each of the actuators 10 is inserted into the opening 9, each of the movable contacts 6 is forced to move into the closed position, and the battery modules A–H is connected in series, thereby allowing the battery pack to apply the voltage of 96 volts from the positive output terminal P and the negative output terminal N to the positive input terminal 17P and the negative input terminal 17N. Because the positive output terminal P and the negative output terminal N are inserted into the insertion hole 21 while the battery pack 1 is attached to the device's main body, a user can not touch the positive output terminal P and negative output terminal N; therefore there is no possibility of an electric shock or a short circuit.

It should be noted that the battery pack 1 is held detachably to the device's main body by a well-known detachable mechanism. Although an explanation about the detachable mechanism is omitted, the present invention can be applied to a device having the well-known detachable mechanism.

Each of the battery modules A–H is a battery module which can be charged from the outside, and every battery modules can be replaced individually.

Figure 2:
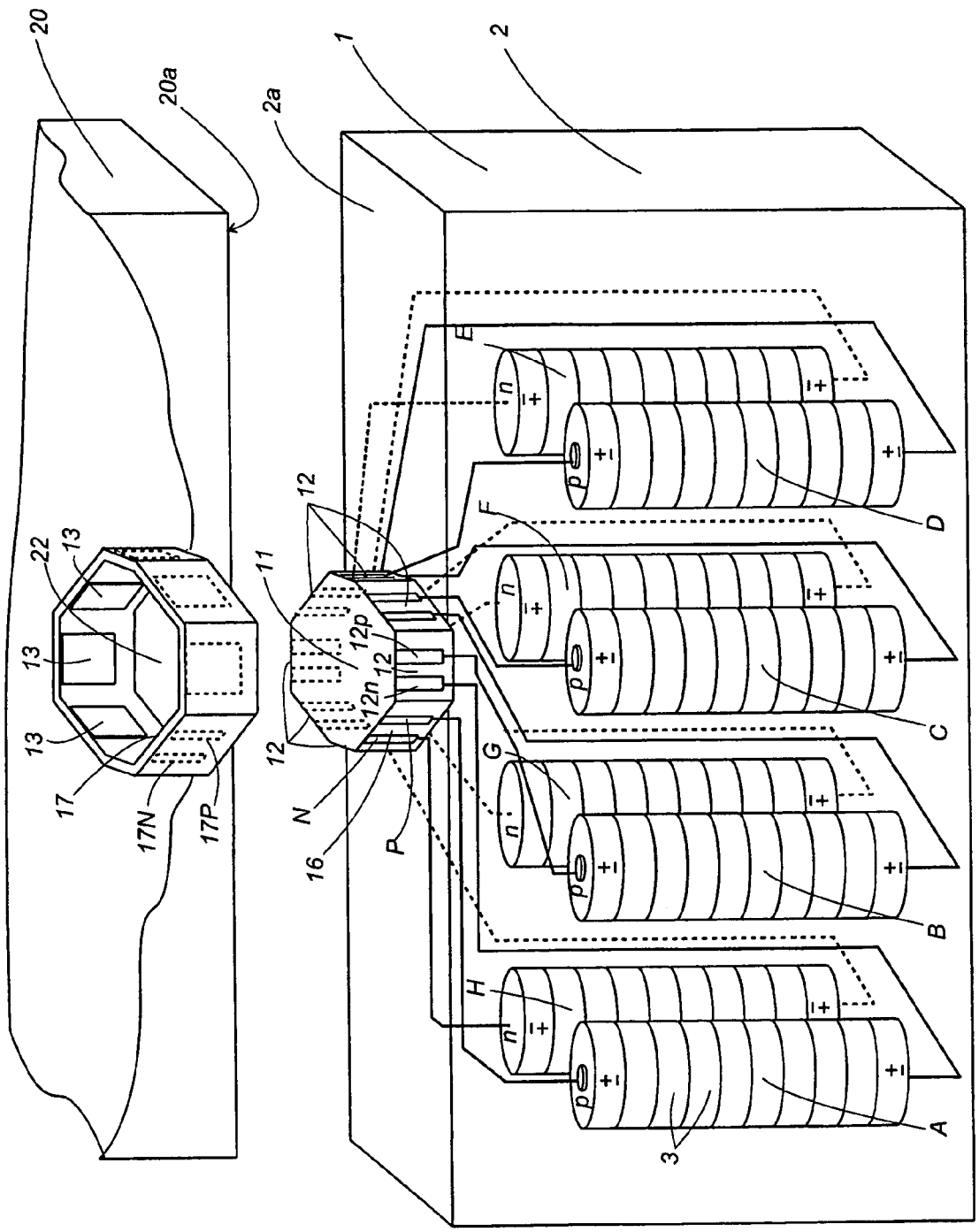
FIG. 2 is a view illustrating a battery powered electrical device in accordance with a second embodiment of the present invention.

FIG. 2 shows a battery pack in accordance with a second embodiment of the present invention. As is the case with the first embodiment, the battery pack 1 has the eight battery modules A–H inside the case 2. A joint part 11, which is in the form of an octagon prism, is formed on the surface 2a of the case 2. An octagon-shaped insertion hole 22 into which the joint part 11 can be inserted is provided on the face 20a of the device's main body 20 to which the battery pack 1 can be attached. The battery pack 1 is attached to the device's main body with the joint part 11 inserted into the insertion hole 22.

On one external side surface out of eight external side surfaces of the joint part 11, an output terminal 16 is formed, and on the seven remaining external side surfaces, a switch 12 is formed, respectively. The output terminal 16 is composed of a positive electrode plate P and a negative electrode plate N, which are disposed in spaced relation to each other. The positive electrode plate P is electrically connected to the positive electrode p of the battery module A. The negative electrode plate N is electrically connected to the negative electrode n of the battery module H. Each of the switches 12 on each external side surface is composed of a pair of fixed electrodes 12n, 12p. The fixed electrodes 12n, 12p is disposed in spaced relation to each other on the same external side surface. The fixed electrode 12n of each of the pairs of fixed electrodes 12n, 12p is electrically connected to a negative electrode n of one of certain adjacent battery modules, and the fixed electrode 12p is electrically connected to a positive electrode p of the other of the adjacent battery modules. For example, one fixed electrode 12n of a certain pair of fixed electrodes 12p, 12n is connected to the positive electrode p of the battery module A of the adjacent battery modules A, B, and the other fixed electrode 12p is connected to the negative electrode n of the other battery module B. One fixed electrode 12n of another pair of fixed electrodes 12p, 12n is connected to the negative electrode n of the battery module B of the adjacent battery modules B, C, and the other fixed electrode 12p is connected to the positive electrode p of the other battery module C.

On one inner surface out of eight inner surfaces of the insertion hole 22 of the device's main body 20, an input terminal 17 is formed, and on the seven remaining inner surfaces, movable plates 13, as actuator, are disposed, respectively. The input terminal 17 is composed of a positive input terminal 17P and a negative input terminal 17N. The positive input terminal 17P and the negative input terminal 17N will contact the positive output terminal P and the negative output terminal N of the output terminal 16, respectively, when the joint part 11 is inserted into the insertion hole 22. When the joint part 11 is inserted into the insertion hole 22, each of the movable plate 13 will contact both of the fixed electrodes 12n, 12p of the switch 12 which are disposed on one surface of the joint part 11 and connect between the fixed electrodes 12n, 12p. When all pairs of the fixed electrodes 12n, 12p are connected by the movable plates 13, all battery modules A–H are connected in series, thereby allowing the positive output terminal P and the negative output terminal N of the output terminal 16 to output the voltage of 96 volts.

Because the fixed contacts 12n, 12p are spaced to each other when the battery pack is not attached to the device's main body 20, the series electrical connection of the battery modules A–H is interrupted then; therefore, the battery pack 1 configured as above can not cause an electric shock or a short circuit even if a body or a piece of metal touches the positive output terminal P and negative output terminal N of the output terminal 16. On the other hand, when the battery pack 1 is attached to the device's main body 20, each of the movable plates 13 electrically connects between the fixed electrodes 12n, 12p, and all of the battery modules A–H are connected in series, thereby allowing the output terminal 16 to apply the voltage of 96 volts to the input terminal 17 of the device's main body 20. Because the output terminal 16 is inserted into the insertion hole 22 while the battery pack 1 is attached to the device's main body, a user can not touch the output terminal 16; therefore there is no possibility of an electric shock or a short circuit. Furthermore, because each of the pairs of the fixed electrodes 12n, 12p is disposed on each surface of the joint part 11, the fixed electrode 12n and the fixed electrode 12p which are connected to the negative electrode n and positive electrode p of the same battery module, respectively, are disposed on different surfaces of the joint part 11. Therefore, even if a body or a piece of metal touches one surface of the joint part 11, there is no possibility that one battery module may cause a short circuit.

Figure 3:
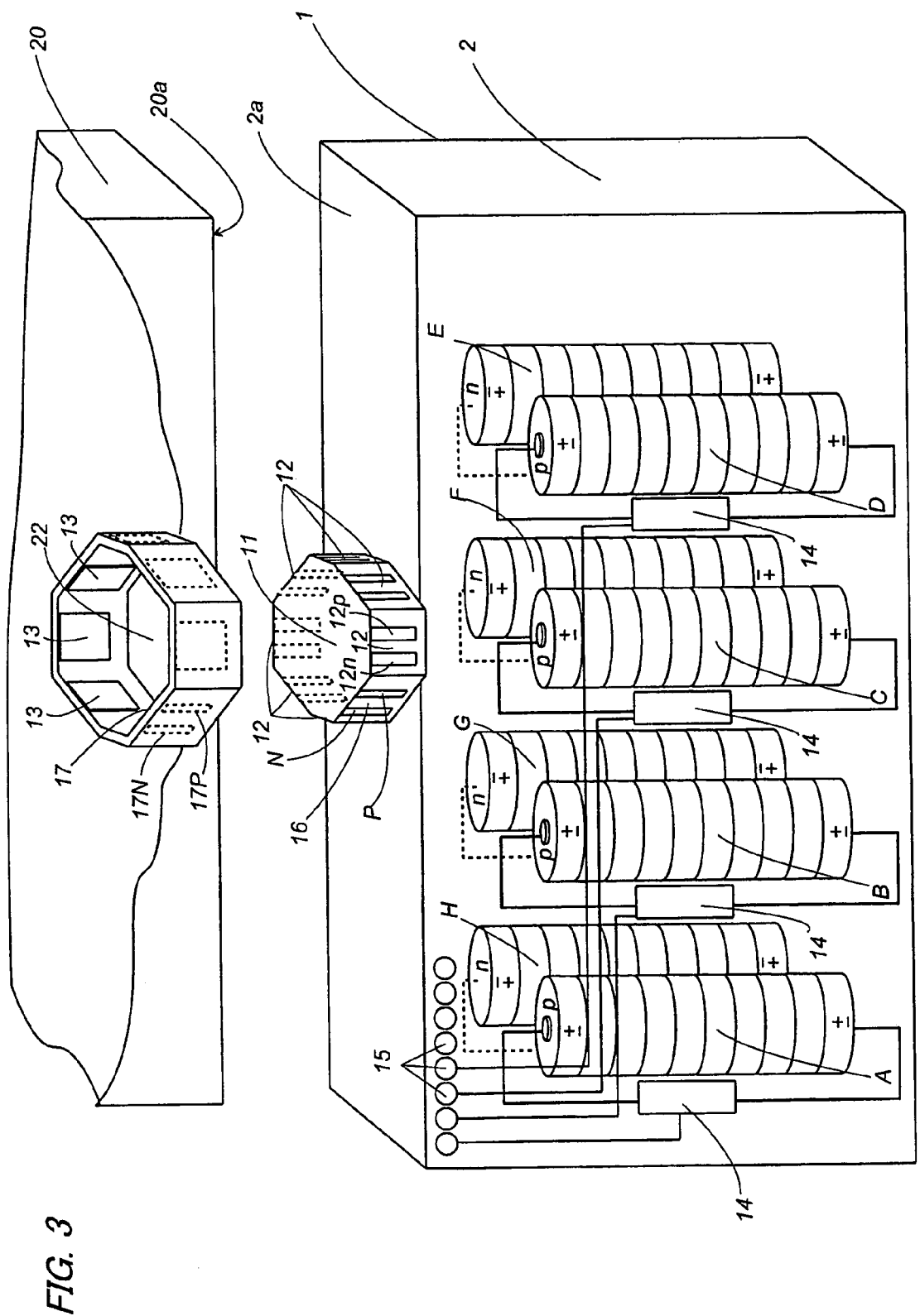
FIG. 3 is a view showing a preferred conformation of the second embodiment of the present invention.

As shown in FIG. 3, eight LEDs 15 are disposed on one surface of the case 2. The LEDs 15 are electrically connected to eight diagnosis circuits 14, respectively, which are held inside the case 2. The diagnosis circuits 14 are provided for each battery module A–H in order to measure a voltage of each battery module. When the measured voltage is below a predetermined value, the diagnosis circuit 14 turns on a corresponding LED 15 and interrupts the series electrical connection automatically to stop the device. By stopping the device when abnormal battery module is found, safety can be secured. The diagnosis circuit 14 may interrupt the series electrical connection automatically to stop the device not only when the diagnosis circuit 14 finds the abnormal battery module but also when the diagnosis circuit 14 judges that the battery module is in the last stage from the measured voltage. In this case, a reverse current (for example, when the battery module A finishes its discharge at an early stage, an electric current will flow into the battery module A which has become a low voltage.) can be prevented, thereby not only securing the safety but also extending the life span. For this purpose, a fail-safe circuit is provided inside the battery pack. When the diagnosis circuit 14 detects that the voltage of the battery module is below a predetermined value or the voltage is in the last stage, the diagnosis circuit 14 will generate an error signal, and in response to the error signal, the fail-safe circuit will turn on the corresponding LED and interrupt the series electrical connection of the battery pack by a switching means.

The invention claimed is:

1. A battery powered electrical device composed of a battery pack and a device's main body detachably holding said battery pack to be powered thereby, said device comprising:
   a case provided in said battery pack for accommodating at least two battery modules each comprising a plurality of battery cells connected in series;
   a switching means provided on a side of said case, said switching means selectively closing and opening a series electrical connection of said at least two battery modules,
   an output terminal formed on said case, said output terminal applying a series-connected voltage of said at least two battery modules to said device's main body upon closing said switching means,
   an actuator provided on a side of said device's main body, wherein said switching means is provided on an electric pathway between said at least two battery modules, and cooperates with said actuator to establish said series electrical connection when said case is attached to said device's main body, and to interrupt said series electrical connection when said actuator is detached from said case.

2. The battery powered electrical device as set forth in claim 1, wherein each of said at least two battery modules has a positive electrode and a negative electrode, said switching means having at least one pair of fixed contacts and a movable contact, said fixed contacts being connected to the positive electrode of one of said at least two battery modules and to the negative electrode of the other of said at least two battery modules, respectively, said movable contact being movable between a closed position where said fixed contacts are connected by the movable contact and an open position where said fixed contacts are disconnected, said movable contact being normally biased toward the open position, said movable contact being disposed within an opening provided in said case in an engageable relation with said actuator so that said movable contact is forced to move into said closed position by said actuator when the actuator is inserted into said opening.

3. The battery powered electrical device as set forth in claim 1, wherein said case has a joint part for coupling to said device's main body, each of said at least two battery modules having a positive electrode and a negative electrode, said switching means having at least one pair of fixed electrodes, said fixed electrodes being connected to the positive electrode of one of said at least two battery modules and to the negative electrode of the other of said at least two battery modules, respectively, said fixed electrodes being disposed on said joint part in spaced relation to each other, said actuator being in the form of a movable plate which interconnects said fixed electrodes electrically when said joint part is coupled to said device's main body.

4. A battery powered electrical device composed of a battery pack and a device's main body detachably holding said battery pack to be powered thereby, said device comprising:
   a case provided in said battery pack for accommodating at least three battery modules;
   a switching means providing on a side of said case, said switching means selectively closing and opening a series electrical connection of said at least three battery modules, an output terminal formed on said case, said output terminal applying a series-connected voltage of said at least three battery modules to said device's main body upon said switching means being closed, actuators provided on a side of said device's main body, wherein said case has a polygon-shaped joint part for coupling to said device's main body, each of said at least three battery modules having a positive electrode and a negative electrode, said switching means having at least two pairs of fixed electrodes, said fixed electrodes being provided for electrical connection between said positive electrode and said negative electrode of adjacent battery modules, said each one pair of the fixed electrodes being disposed on each one of different faces of said polygon-shaped joint part, said fixed electrodes in said each pair on the same face being disposed in spaced relation to each other, each of said actuators being in the form of a movable plate which interconnects between said one pair of the fixed electrodes when said case is physically coupled to said device's main body.

* * * * *